(12) United States Patent
Davey

(10) Patent No.: US 8,444,830 B2
(45) Date of Patent: May 21, 2013

(54) DESALINATION

(76) Inventor: Garth Davey, Sommerville (AU)

( * ) Notice: Subject to any disclaimer, the term of this patent is extended or adjusted under 35 U.S.C. 154(b) by 612 days.

(21) Appl. No.: 12/665,936

(22) PCT Filed: Jun. 17, 2008

(86) PCT No.: PCT/AU2008/000872
§ 371 (c)(1),
(2), (4) Date: Mar. 18, 2010

(87) PCT Pub. No.: WO2009/000016
PCT Pub. Date: Dec. 31, 2008

(65) Prior Publication Data
US 2010/0181185 A1    Jul. 22, 2010

(30) Foreign Application Priority Data

Jun. 22, 2007 (AU) .............................. 2007903378

(51) Int. Cl.
*B01D 1/18* (2006.01)
*B01D 1/28* (2006.01)
*B01D 3/10* (2006.01)
*B01D 3/42* (2006.01)

(52) U.S. Cl.
USPC ............. 203/10; 159/24.2; 159/33; 159/43.1; 159/44; 159/46; 159/48.1; 159/DIG. 16; 202/176; 202/182; 202/202; 202/205; 202/236; 203/1; 203/11; 203/22; 203/24; 203/25; 203/27; 203/90; 203/91; 203/100; 203/DIG. 7; 203/DIG. 16; 203/DIG. 17; 203/DIG. 25

(58) Field of Classification Search
USPC ................... 159/24.2, 33, 43.1, 44, 46, 48.1, 159/DIG. 16; 202/176, 182, 202, 205, 236; 203/1, 10, 11, 22, 24, 25, 27, 90, 91, 100, 203/DIG. 7, DIG. 16, DIG. 17, DIG. 25
See application file for complete search history.

(56) References Cited

U.S. PATENT DOCUMENTS

| | | | | |
|---|---|---|---|---|
| 3,450,601 A | * | 6/1969 | Brown | 202/174 |
| 3,471,373 A | * | 10/1969 | Pottharst, Jr. | 202/181 |
| 3,578,071 A | * | 5/1971 | Johnston | 165/66 |
| 4,440,578 A | * | 4/1984 | Wadia | 106/740 |
| 4,863,567 A | * | 9/1989 | Raley | 202/182 |
| 5,122,233 A | * | 6/1992 | Zampieri | 202/205 |
| 5,395,483 A | * | 3/1995 | Al-Hawaj | 159/2.3 |
| 5,792,663 A | * | 8/1998 | Fry et al. | 436/73 |
| 2008/0070177 A1 | * | 3/2008 | Hansen et al. | 432/108 |
| 2009/0152093 A1 | * | 6/2009 | Millar | 203/10 |

FOREIGN PATENT DOCUMENTS

| | | |
|---|---|---|
| DE | 19717451 | 10/1998 |
| FR | 2531418 | 2/1984 |
| GB | 1480069 | 7/1977 |

* cited by examiner

*Primary Examiner* — Virginia Manoharan
(74) *Attorney, Agent, or Firm* — Davis Wright Tremaine LLP; George C. Rondeau, Jr.

(57) ABSTRACT

A desalination process including heating brine in a preheating chamber and transferring the brine to a rotary kiln to be sprayed against the wall structure of the rotary kiln to boil to steam and a residue of salt/impurities, the exiting steam being pressurized in a compressor and passed to an externally powered heater to be heated and then fed to a hollow wall structure of the rotating kiln in which the steam condenses to pure water to be transferred to the preheating chamber to preheat the incoming brine, the rotating kiln being arranged to rotate past a scraper to remove salt/impurities from the wall structure for collection at the base of the kiln.

16 Claims, 1 Drawing Sheet

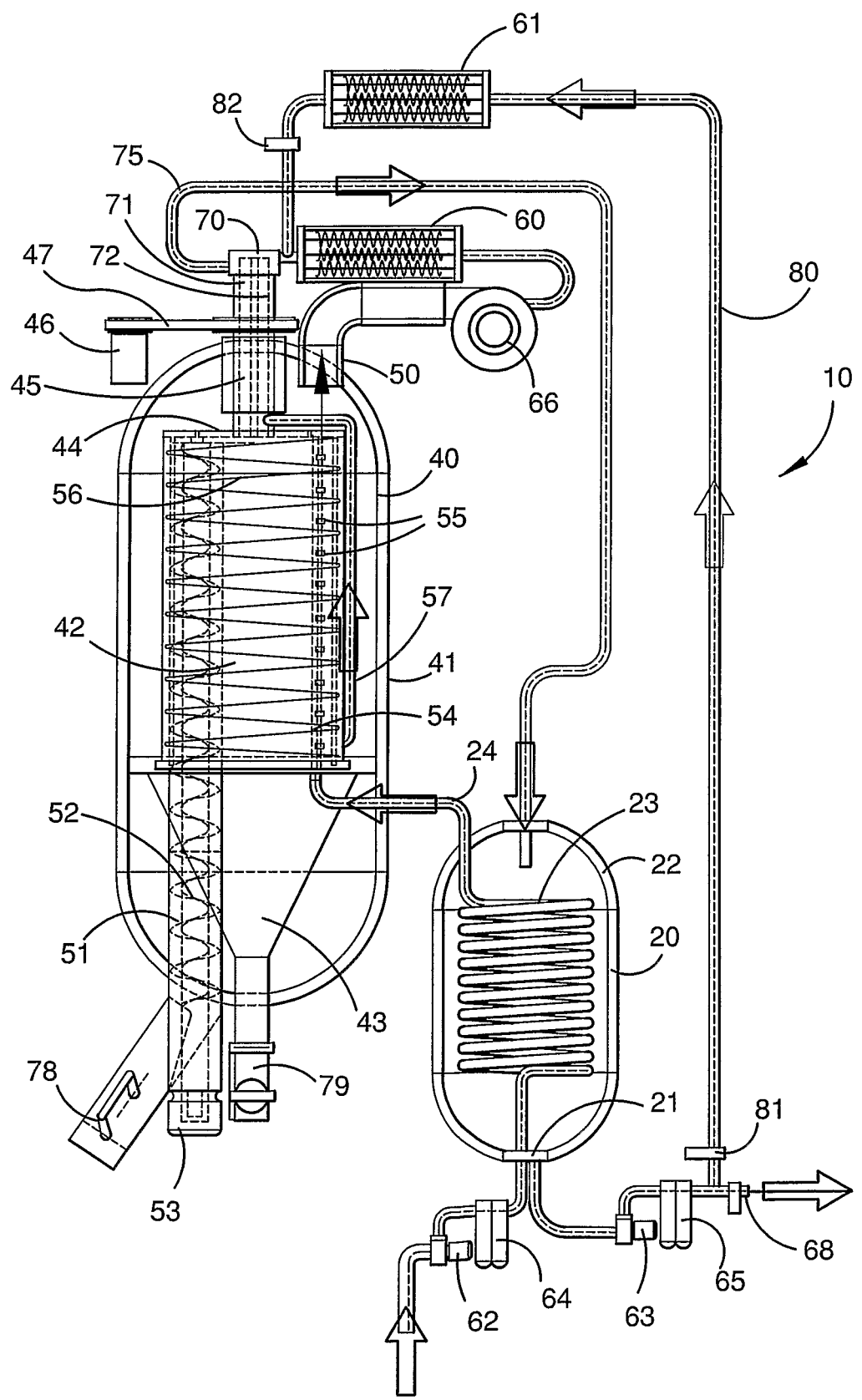

DESALINATION

CROSS-REFERENCE TO RELATED APPLICATION

This application is a national stage entry of PCT/AU2008/00872, international filing date Jun. 17, 2008.

This invention relates to desalination plants and a process for evaporative desalination.

BACKGROUND OF THE INVENTION

Global climate change and worldwide droughts have placed increased emphasis on water and, in particular, fresh water.

One known means of producing fresh water is through desalination. There are two common means of desalination, evaporative desalination where salt water is evaporated and then condensed to produce fresh water; and desalination through reverse osmosis.

Both processes require a great deal of energy and are usually confined to coastal resorts where there is a ready supply of sea water. However, there are a number of countries where the salt table is rising which means there are plentiful supplies of salt water inland.

It is these issues that have brought about the present invention.

SUMMARY OF THE INVENTION

According to a first aspect of the present invention, there is provided a desalination process in which brine is boiled in a rotating kiln to form steam and a salt residue and the steam is condensed to pure water in the same kiln and the salt residue is removed from the base of the kiln.

According to a further aspect of the present invention, there is provided a desalination plant comprising a preheating chamber coupled to a rotatable kiln with a hollow wall structure, the kiln having a gas outlet connected via a compressor to the hollow wall of the kiln which is in turn coupled to the pre-heating chamber and a scraper positioned against an inner wall of the kiln, whereby, in use, brine is heated in the pre-heating chamber and boiled in the rotary kiln to steam and a residue of salt/impurities, the steam being compressed and then fed to the hollow wall structure in which the steam condenses to pure water to be transferred to the preheating chamber to preheat the incoming brine, the rotating kiln being arranged to rotate past the scraper to remove salt/impurities from the inner wall.

In accordance with a still further aspect of the present invention, there is provided a kiln for a desalination plant comprising a hollow wall with a tapered base, the kiln containing a brine infeed comprising a plurality of vertically spaced nozzles, the nozzles being arranged to direct brine against an inner wall of the kiln, a scraper positioned adjacent the inner wall of the kiln and means to cause axial rotation of the kiln.

DESCRIPTION OF THE DRAWING

An embodiment of the present invention will now be described by way of example only with reference to the accompanying schematic illustration of a desalination plant.

DESCRIPTION OF THE PREFERRED EMBODIMENTS

The present invention relates to a desalination plant in which salt water is boiled and then condensed to form fresh water. The salt produced as the salt water is boiled is collected for disposal and the heat in the steam is returned to the plant as a form of energy. This invention has the advantage that it is energy efficient and causes total evaporation of the salt water meaning that the only by-products are salt and fresh water.

This is in contrast with most desalination plants where another by-product is water with high concentration of salt which is then usually returned to the sea.

As shown in the accompanying drawing, the desalination plant 10 essentially comprises a preheater 20, a rotary kiln 40, two external electrically powered heaters 60, 61, a vapour compressor 66, pumps 62, 63 and filters 64, 65.

Incoming brine, often seawater or inland saltwater, is pumped at ambient temperature by the pump 62 through a series of filters 64 to remove solid matter from the brine. The filtered brine is then pumped into the base 21 of the preheater 20 that has an insulated exterior casing 22 and contains a spiral copper heat exchanger 23, the exit 24 of which is fed through the insulated outer casing 22 to the kiln 40. The kiln 40 comprises an outer casing 41 that contains a double skinned rotary kiln 42 that is in turn mounted above a frusto-conical hopper 43 located in the base of the casing 41. The top 44 of the double skinned kiln 42 has an upwardly projecting hollow spigot 45 which extends through the top of the insulating casing 41 and is coupled to be axially rotated by an electric motor 46 and drive 47. The outer casing 41 of the kiln also includes an outlet duct 50 and this upper surface of the kiln 42 has four equally spaced exit holes (not shown) to allow steam to pass to the outlet duct 50.

A rotary scraper 51 in the form on an elongate helical worm 52 extends up through the base of the kiln 40 up through the length of the kiln 40 adjacent one side of that kiln as shown in the drawing. An electric motor 53 and gear box (not shown) drives the rotary scraper 51 adjacent the inner wall of the kiln 42.

The brine is fed from the heat exchanger 23 through the side wall of the kiln 40 into a vertically extending column 54 in the double skinned kiln 42 and is sprayed onto the interior wall of the kiln via a plurality of spaced nozzles 55 along the column 54. The interior of the double walled structure of the kiln 42 has a helical passageway 56 extending from the top to the bottom and there is a return conduit 57 from the bottom of the passageway back to the hollow spigot 45.

The exit duct 50 facilitates passage of steam generated when the brine is sprayed against the hot interior wall of the kiln to exit the kiln and then be compressed in the vapour compressor 66 before being fed to the first electrically powered heater 60. The compressor 66 draws off the steam at 100° C. and ensures that the kiln 40 operates at a slight vacuum (0.5 bar). The heater 60 heats up the steam exiting the compressor 66 at a pressure of 1 bar to a temperature of about 150° C. The exiting steam is passed into a double rotary port 70 mounted on the end of the spigot 45 and this has a first passageway 71 which communicates with the top of the helical passage 56 between the double skin of the kiln 42. The steam is then helically transferred down the length of the kiln 42, across the base until it condenses. As the steam cools from 150° at the top of the kiln to 110° towards the lower end, it heats up the internal wall of the kiln 42 to ensure that when the preheated brine is sprayed against the wall it boils. The return conduit 57 feeds the condensed pure water at about 110° and a pressure of 0.5 bar to pass up through the rotating spigot 45 along second passageway 72 to the rotary port 70 to then pass along a feedback loop 75 which feeds into the top of the preheater 20. Water enters the preheater 20 at 110° and transfers its heat to the copper coil 23 to collect in the base of the chamber 20.

The pump 63 then draws off the cooled water at ambient temperature to be fed through a bank of filters 65 for collection via a discharge port 68.

When the brine in the kiln 42 boils, a residue of salt and impurities drops down into the base hopper 43 for collection. The residue of salt also has a tendency to adhere to the inner wall of the kiln 42 and the rotary scraper 51 is positioned very close to (about 1 mm) that wall to cause removal of salt deposits as the kiln rotates which then fall down the worm 52 to collect in the base of the rotary scraper. Both the hopper 43 and the rotary scraper 51 have a dual valved outlet 78, 79 which effects a double seal so that the salt can be released without letting air into the chamber that is at partial vacuum. This is carried out by a pair of ganged discharge valves in each outlet. The salt travels down the tube and settles on the upward surface of a closing valve, there is an identical valve located behind it. The two valves are timed and operated electronically. They are never both open together. When sufficient salt has collected on the top valve, it opens and allows the salt to fall to the bottom closed valve. The top valve is then closed before the bottom valve is opened to release the salt.

The kiln is operated at a pressure less than atmosphere to ensure that the incoming steam can condense at a temperature greater than 100° C. The wall temperature of the kiln varies from about 150° at the top to about 110° at the base and these temperatures ensure that when the brine which enters the kiln at about 99° and a pressure of 1 bar boils when it is sprayed against the wall of the kiln. That steam is then picked up by the compressor 66 and then compressed which further increases its temperature. The external heater 60 then ensures it is heated to 150° at a pressure of 1 bar. At that time, it is then fed back into the heat exchanger defined by the double wall of the kiln 42 and this is the heat which is used to boil the brine. Once the steam has condensed and is liquid at a temperature of 110° C. but in a slight vacuum, it passes through the bypass passageway 75 to enter the preheater 20 where, again, the heat of that water assists the preheating of the brine in the coil 23 at ambient temperature to ensure it leaves the preheater at a temperature of about 99° C.

In this way, the desalination plant not only causes a virtual total evaporation of the brine so that the salt/impurity residue can be collected, in a solid form, at the base progressively as the process operates, it also has the advantage that it is energy conservative in the sense that the latent heat used to boil the brine is compensated with the latent heat given off by the condensation of the steam in the same kiln. The heat of the boiled brine is used to assist in the heating of the kiln 40 and the heat present in the condensed pure water is used in the preheating chamber 20. The external use of power is confined to pumps 62, 63, drive motors 46, 53, the external electrical heater 60 and vapour compressor 60.

The kiln is rotated at a speed which creates a 4G centrifugal force which forces the spray of incoming brine against the hot inner wall of the kiln to ensure high contact conductivity to rapidly boil the brine. The rotation speed also throws off the condensed liquid from the walls of the helical chamber to minimise the insulating effect this liquid may have on the incoming steam heating the inner wall of the kiln.

The salt/impurity residue can then be subjected to a variety of separation processes to extract saleable components from the residue.

The desalination plant described above has one further component which is required and that is to ensure start up. To ensure the components get to the desired temperature for the process to work, a bypass loop 80 is provided in the process that takes pure water and pumps that water into an external heater 61 which is electrically powered. The water is heated so that it boils and becomes steam at 150° C., that is then fed to the exit of the first heater 60 so that it then passes into the rotary port 70 and then down into the kiln 40. The water at 150°, on passing through the helical double wall of the kiln 42, ensures that the internal wall of the kiln is at the desired temperature. That water then condenses in the base of the kiln 42 and is then passed back up through the rotary port 70 to return to the top of the preheater 20 which in turn causes the incoming brine to reach the desired temperature of 99° C. Once the components have reached the desired temperature, isolation valves 81, 82 at the start and end of the feedback loop 80 can be closed off to ensure the process then starts to operate on an input of brine.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A desalination process comprising feeding a source of hot water via a start up line into a rotating kiln to preheat the kiln, controlling the feed of hot water in the start up line by an isolation valve, boiling brine in the rotating kiln to form steam and a salt residue, condensing the steam to purified water in the rotating kiln and removing the salt residue from the kiln.

2. The desalination process according to claim 1 wherein condensing the steam to purified water occurs in a hollow wall structure of the kiln.

3. The desalination process according to claim 2 comprising compressing and heating the steam prior to transfer to the hollow wall structure of the kiln.

4. The desalination process of claim 3 whereby the compressing of the steam causes a partial vacuum in the kiln.

5. The desalination process according to claim 1 wherein condensing the steam includes producing condensed steam, and further comprising feeding the condensed steam to a pre-heater as a heating medium to heat incoming brine and collecting the condensed steam as purified water from the pre-heater.

6. The desalination process according to claim 1 comprising spraying brine against the wall of the kiln through use of a column of vertically spaced nozzles.

7. The desalination process according to claim 1 comprising removing salt residue from the wall of the kiln by rotating the kiln against a scraper causing the salt deposits to fall to the base of the kiln.

8. The desalination process according to claim 7 removing the salt residue via controlled discharge valves.

9. A desalination process comprising pre-heating a rotary kiln by feeding a source of hot water to the kiln via a start up line, controlling the feed of hot water by an isolation valve, spraying brine against the wall of the kiln to boil the brine to form steam and a salt residue, pressurising the exiting steam in a compressor causing a partial vacuum in the kiln and heating the steam in an externally powered heater, feeding the steam to a hollow wall structure of the kiln in which the steam condenses to purified water, transferring the purified water to a pre-heater to pre-heat the incoming brine, and rotating the kiln past a scraper to remove salt residue from the hollow wall structure for collection at the base of the kiln.

10. A desalination plant comprising a preheating chamber coupled to a rotatable kiln having a hollow wall structure, the kiln having a gas outlet connected via a compressor to the hollow wall structure which is in turn coupled to the preheating chamber and a scraper positioned against an inner wall of the hollow wall structure of the kiln, whereby, in use, brine is heated in the preheating chamber and boiled in the rotary kiln to steam and a residue of salt, the steam is compressed and then fed to the hollow wall structure in which the steam condenses to purified water which is transferred to the preheating chamber to preheat the incoming brine, the rotating kiln being arranged to rotate past the scraper to remove salt from the inner wall structure, and a start-up line feeds hot water via a heater to the wall structure of the kiln, at least one isolation valve controlling operation of the start-up line to ensure that the wall structure of the kiln is at a desired temperature prior to entry of the brine.

11. The desalination plant according to claim 10, wherein an externally powered heater is positioned between the compressor and the hollow wall structure of the kiln.

12. The desalination plant according to claim 10, wherein the hollow wall structure of the kiln defines a helical path through which the steam passes to condense to purified water.

13. The desalination plant according to claim 10, wherein a series of vertically spaced nozzles are positioned within the kiln, so that in use, brine can be sprayed against the rotating wall of the kiln.

14. The desalination plant according to claim 10, wherein the kiln has a tapered base into which the residue of salt collects.

15. The desalination plant according to claim 14, wherein a control valve is positioned in the base of the kiln to facilitate collection of the salt residue from the base of the kiln.

16. The desalination plant according to claim 10, wherein the scraper is an axially rotatable worm.

* * * * *